United States Patent [19]
Asagao et al.

[11] 4,269,814
[45] May 26, 1981

[54] PROCESS FOR PREPARING CRYSTALLINE AMMONIUM DIHYDROGEN PHOSPHATE

[75] Inventors: Soichi Asagao; Masaru Nakatani; Shinsuke Nakagawa; Yoshiyuki Takahara; Naoki Okada, all of Ube, Japan

[73] Assignee: Central Glass Company, Limited, Ube, Japan

[21] Appl. No.: 70,499

[22] Filed: Aug. 28, 1979

[30] Foreign Application Priority Data

Aug. 30, 1978 [JP] Japan .................................. 53-104864

[51] Int. Cl.³ .............................................. C01B 25/28
[52] U.S. Cl. ..................................... 423/308; 423/310
[58] Field of Search ....................... 423/308, 310, 265; 71/34

[56] References Cited

U.S. PATENT DOCUMENTS

| 1,514,912 | 11/1924 | Klugh ............................ 423/310 |
| 3,179,496 | 4/1965 | Skinner et al. ................. 423/310 |
| 3,275,566 | 9/1966 | Langguth ...................... 423/308 |
| 3,446,581 | 5/1969 | Smith et al. .................... 423/310 |
| 3,446,582 | 5/1969 | Smith et al. .................... 423/310 |

FOREIGN PATENT DOCUMENTS

| 95890 | 9/1968 | France ............................. 423/310 |
| 390187 | 3/1933 | United Kingdom ............ 423/308 |

Primary Examiner—Herbert T. Carter
Assistant Examiner—Wayne A. Langel
Attorney, Agent, or Firm—Fleit & Jacobson

[57] ABSTRACT

A process for preparing crystalline ammonium dihydrogen phosphate, comprises the steps of (a) adding a sequestering agent into ammonium hydrogen phosphate aqueous solution, the sequestering agent reacting with metallic ions contained in the aqueous solution to form water soluble compounds, (b) heat-treating the aqueous solution at a temperature of 70° C. or more after addition of the sequestering agent, and (c) crystallizing ammonium dihydrogen phosphate out of the aqueous solution after the heat-treating, so that crystalline ammonium dihydrogen phosphate can be obtained in high whiteness and in the form of columnar crystals.

3 Claims, No Drawings

PROCESS FOR PREPARING CRYSTALLINE AMMONIUM DIHYDROGEN PHOSPHATE

BACKGROUND OF THE INVENTION

This invention relates to a process for preparing crystalline ammonium dihydrogen phosphate ($NH_4H_2PO_4$) which is high in whiteness and in the columnar form, and more particularly to the same process for preparing ammonium dihydrogen phosphate from wet process phosphoric acid.

In accordance with a conventional process for preparing ammonium dihydrogen phosphate from wet process phosphoric acid, a formed crystalline ammonium dihydrogen phosphate is in the form of needle crystal which is colored by the effect of various impurities. These impurities include organic compounds and inorganic metallic ions.

The organic compounds may be removed to a considerable extent by means, for example, of oxidation or reduction treatment, or active carbon treatment. However, the metallic ions are considerably difficult to be removed even by such a treatment, because they are relatively liable to enter the crystal of ammonium dihydrogen phosphate and tend to be concentrated by some treating manners. Additionally, the crystal form of ammonium dihydrogen phosphate becomes needle-like by the effect of such impurities.

In this regard, it has also been proposed to repeat the recrystallization of ammonium dihydrogen phosphate crystal, by which the impurities in the crystal of the ammonium dihydrogen phosphate can be removed to some extent. However, such a proposition encounters the following disadvantages from point of view of industrial manufacturing: not only process is complicated, but also the yield of ammonium dihydrogen phosphate is liable to decrease, contributing to economical disadvantage. Additionally, even by this proposition, the crystal form of ammonium dihydrogen phosphate can not improved to a desired extent.

Ammonium dihydrogen phosphate is usually crystallized in the needle-like form in case where the phosphate is prepared by the reaction of wet process phosphoric acid and ammonia. Such needle-like crystal is disadvantageous because it is not effective for filtration, and bulk density is considerably low increasing storing and wrapping costs. Furthermore, the needle-like crystal is relatively liable to be blocked in a container.

Now, such crystalline ammonium dihydrogen phosphate is used as the starting materials for various phosphates, baking powder, boiler compounds, decoloring agent for wool, powdered fire extinguishing agents and food additives. Of these, the use as the fire extinguishing agent is recently increasing, the powder of which agent is required to be uniform and in the form of fine particles. It is to be noted that as the powdered fire extinguishing agent, columnar or granulated crystal is desirable because the needle-like crystal is not suitable to be injected from a fire extinguisher.

SUMMARY OF THE INVENTION

In view of the above, the present invention contemplates obtaining crystalline ammonium dihydrogen phosphate in the desired color and form, by preventing inorganic ions contributing to coloring crystal from entering the crystal, in which the inorganic ions remain in mother liquor forming chelate compounds.

It is the principal object of the present invention to provide an improved process for preparing crystalline ammonium dihydrogen phosphate which is in the color and in the crystal form suitable for recent various uses and handling, without inviting economical disadvantages.

It is another object of the present invention to provide an improved process for preparing crystalline ammonium dihydrogen phosphate which is high in whiteness and generally in columnar crystal form.

It is a further object of the present invention to provide an improved process for preparing crystalline ammonium dihydrogen phosphate in the form of columnar crystal, by which the impurities contained in ammonium dihydrogen crystal are effectively removed without repetition of recrystallization.

It is a still further object of the present invention to provide an improved process for preparing crystalline ammonium dihydrogen phosphate, in which metallic ions contributing coloring crystals are effectively removed by preventing the formation of their metallic salts, which is accomplished by forming the chelate compounds between the metallic ions and a sequestering agent.

These and other objects, features and advantages of the process in accordance with the present invention will be more apparent from the following description.

PREFERRED EMBODIMENTS OF THE INVENTION

In accordance with the process of the present invention, at least a kind of sequestering agent is added into ammonium dihydrogen phosphate aqueous solution, in which the sequestering agent reacts with metallic ions contained in the aqueous solution to form water soluble compounds. The ammonium dihydrogen phosphate aqueous solution is purified by active carbon treatment prior to addition of the sequestering agent in order to remove almost all organic compounds contained in the aqueous solution, if necessary. Then, the aqueous solution to which the sequestering agent is added is heat-treated at a temperature of 70° C. or more. Thereafter, the crystallization of ammonium dihydrogen phosphate is carried out in the aqueous solution.

As the above-mentioned sequestering agent for forming water-soluble compound with metallic ions contained in the ammonium dihydrogen phosphate aqueous solution, at least one of a sequestering agent of water-soluble salt of polyaminocarboxylic acid and a sequestering agent of a condensed phosphate is used. The sequestering agent of the water-soluble salt of polyaminocarboxylic acid is ethylenediamine tetraacetate (E. D. T. A), nitrilotriacetate (N. T. A) or diethylenetrinitrilo pentaacetate (D. T. P. A). The sequestering agent of condensed phosphate is sodium pyrophosphate ($Na_4P_2O_7$), sodium tripolyphosphate ($Na_5P_3O_{10}$), sodium hexametaphosphate ($NaPO_3)_6$, or the ammonium salt of each of them. As appreciated from the above, it is essential to use the sequestering agent in the process according to the present invention.

In order to accomplish the process of the present invention, at first wet process phosphoric acid solution is purified by a known method such as using active carbon to remove the impurities such as organic compounds etc. Subsequently, the purified wet process phosphoric acid solution is contacted with ammonia so as to react with each other until N/P mol ratio reaches to a value of 0.8/1 to 1.5/1, preferably 1.05/1 to 1.2/1 to obtain about 50 wt. percent ammonium dihydrogen phosphate aqueous solution which is then separated by filtration to remove the impurities such as Fe, Al etc. Thereafter, the sequestering agent is added into the filtrate of ammonium dihydrogen phosphate, and the filtrate is then heat-treated at 70° C. or more and for more and for 5 minutes or more, preferably 10 to 60 minutes, by which inorganic coloring ions react with the sequestering agent to form water-soluble chelate compounds. Lastly, ammonium dihydrogen phosphate is crystallized out of the aqueous solution by a known crystallization method to obtain columnar crystal of ammonium dihydrogen phosphate which is excellent in whiteness, since the above-mentioned chelate compounds remain in a mother liquor.

With respect to the reaction temperature and time for forming the chelate compounds, if the temperature lower than 70° C. and the time is less than 5 minutes, the chelation is insufficient and therefore it is difficult to attain sufficient decoloring effect and obtain columnar crystal.

As appreciated from the above, it is essential to use the sequestering agent in the process according to the present invention. It is to be noted that, of the above-mentioned various sequestering agents, E. D. T. A is particularly high in ability for causing the chelation and consequently even a slight amount of E. D. T. A is effective for such chelation. Additionally, the amount of E. D. T. A required for the chelation is sufficient to be less, as the N/P mol ratio becomes higher.

With respect to the amount of the sequestering agent to be added to ammonium dihydrogen phosphate, it is variable depending upon starting material phosphoric acids, and it is preferable that about 0.2 wt. percent or more sequestering agent is added to about 50 wt. percent ammonium dihydrogen phosphate aqueous solution (about 0.1 wt. percent sequestering agent relative to the crystals of ammonium dihydrogen phosphate). More preferably, 0.2 to 2 wt. percent sequestering agent is added to about 50 wt. percent ammonium dihydrogen phosphate aqueous solution (0.1 to 1 wt. percent sequestering agent relative to the crystals of ammonium dihydrogen phosphate). In this regard, if the added amount of the sequestering agent is less than 0.2 wt. percent, chelation effect is inferior, whereas even if the added amount is more than 2 percent, much improved chelation effect cannot be expected.

The present invention will be illustrated in detail by the following examples.

EXAMPLE 1

Soda ash was added to wet process phosphoric acid having a $P_2O_5$ concentration of about 27% which phosphoric acid was obtained from Florida phosphate rock, to precipitate fluorine compounds as sodium silicofluoride. The precipitate of the sodium silicofluoride was then separated by filtration using a vacuum filter to obtain filtrate. Subsequently, gaseous ammonia was blown into the filtrate so that the pH value was adjusted to 4.6 to form the precipitate of hydroxide. The precipitate of hydroxide was then removed by a centrifugal separator to obtain 46 wt. percent ammonium dihydrogen phosphate aqueous solution. 0.2 wt. percent active carbon was added into the ammonium dihydrogen phosphate aqueous solution, and subsequently the active carbon was separated by filtration after aging to remove organic compounds. E. D. T. A.$2Na.2H_2O$ was added to the filtration of ammonium dihydrogen phosphate aqueous solution, in which the amount of E. D. T. A was varied relative to the weight of the ammonium dihydrogen phosphate aqueous solution in the state before the treatment with active carbon. Then, the ammonium dihydrogen phosphate aqueous solution was kept at 90° C. or more and for 20 minutes, and thereafter the aqueous solution was cooled until 35° C. at a rate of 1° C./minute in a container equipped with an agitator to crystallize ammonium dihydrogen phosphate. The thus formed crystal was separated by a small-sized centrifugal separator and then washed with a small amount of ammonium dihydrogen phosphate saturated solution. As a result, columnar crystals of ammonium dihydrogen phosphate which are high in whiteness are obtained by the above-mentioned addition of 0.2 wt. percent or more E. D. T. A.$2Na.2H_2O$ as shown in Table 1 mentioned below,

TABLE 1

| E.D.T.A. · 2Na · 2H$_2$O added amount (%) | color | crystal form | whiteness |
|---|---|---|---|
| 0 | greenish blue | needle-like | 91.5 |
| 0.10 | light greenish blue | needle-like | 94.2 |
| 0.20 | white(slightly colored) | columnar | 97.2 |
| 0.50 | white | columnar | 98.6 |
| 0.75 | white | columnar | 99.2 |

Note:
(1) the needle-like form is 5/1 or higher in the ratio of the major axis/the minor axis, whereas the columnar form is lower than 5/1 in the same ratio.
(2) the whiteness is relative values to a standard value (100.0) of a reagent ammonium dihydrogen phosphate. The relative values were determined according to JIS (Japanese Industrial Standard) Z 8730.

EXAMPLE 2

0.75 wt. percent E. D. T. A.$2Na.2H_2O$ was added to 900 g of 46 wt. percent ammonium dihydrogen phosphate aqueous solution which was the same as used in EXAMPLE 1 and obtained after the treatment with active carbon. Then, the aqueous solution was heat-treated at 90° C. or more and for 30 minutes, and subsequently concentrated at 50° C. under vacuum until the amount of evaporated water reached to 250 g, immediately after which the crystal of ammonium dihydrogen phosphate was separated by a small-sized centrifugal separator. The separated crystal was washed with a small amount of ammonium dihydrogen phosphate saturated solution to obtain 203 g of crystalline ammonium dihydrogen phosphate. The thus obtained crystal was columnar and white exhibiting the whiteness of 99.0. For comparison, a comparative ammonium dihydrogen phosphate was prepared by the same process as mentioned above with the exception that no metallic ion blocking agent was added. The resultant comparative ammonium dihydrogen phosphate was needle-like and greenish blue crystal which exhibits the whiteness of 89.3.

EXAMPLE 3

A variety of rates of N. T. A.$Na_3.H_2O$ were added to 46 wt. percent ammonium dihydrogen phosphate which was the same as used in EXAMPLE 1 and obtained after the treatment with active carbon. Then, the aqueous solution was kept at 80° C. and for 30 minutes and thereafter treated similarly to in EXAMPLE 1 to obtain crystalline ammonium dihydrogen phosphate. The whiteness and form of the resultant crystals of ammonium dihydrogen phosphate are shown in Table 2 below.

TABLE 2

| N.T.A. · Na₃ · H₂O added amount (%) | color | crystal form | whiteness |
| --- | --- | --- | --- |
| 0 | greenish blue | needle-like | 91.5 |
| 0.1 | greenish blue | needle-like | 92.9 |
| 0.2 | light blue | needle-like | 93.6 |
| 0.5 | light blue white(slightly colored) | columnar | 96.4 |
| 1.0 | light green | columnar | 94.0 |
| 2.0 | light blue | needle-like | 92.7 |

EXAMPLE 4

A variety of rates of sodium tripolyphosphate was added to 46 wt. percent ammonium dihydrogen phosphate aqueous solution which was the same as used in EXAMPLE 1 and obtained after treatment with active carbon. Then, the aqueous solution was kept at about 80° C. and for 40 minutes and thereafter treated similarly to in EXAMPLE 1 to obtain crystalline ammonium dihydrogen phosphate. The whiteness and the form of the resultant crystals of ammonium dihydrogen phosphate are shown in Table 3 below.

TABLE 3

| Na₅P₃O₁₀ added amount(%) | color | crystal form | whiteness |
| --- | --- | --- | --- |
| 0 | greenish blue | needle-like | 91.5 |
| 0.2 | greenish blue | needle-like | 92.3 |
| 1.0 | greenish blue | needle-like | 92.8 |
| 2.0 | greenish blue | needle-like | 93.5 |
| 5.0 | bright green | needle-like | 94.6 |

EXAMPLE 5

A variety of rates of E. D. T. A.2Na.2H₂O and sodium pyrophosphate was added to 46 wt. percent ammonium dihydrogen phosphate which was the same used in EXAMPLE 1 and obtained after the treatment with active carbon. Then, the aqueous solution was kept at about 95° C. and for about 30 minutes and thereafter treated similarly to in EXAMPLE 1 to obtain crystalline ammonium dihydrogen phosphate. The whiteness and the form of the resultant crystal of ammonium dihydrogen phosphate are shown in Table 4 below.

TABLE 4

| added amount (%) | | color | crystal form | whiteness |
| --- | --- | --- | --- | --- |
| E.D.T.A. · 2Na · 2H₂O | 0.2 | white | columnar | 96.8 |
| sodium pyrophosphate | 0.2 | | | |
| E.D.T.A. · 2Na · 2H₂O | 0.5 | white | columnar | 99.0 |
| sodium pyrophosphate | 0.2 | | | |

What is claimed is:

1. A process for preparing crystalline ammonium dihydrogen phosphate from an aqueous solution of ammonium dihydrogen phosphate obtained from wet process phosphoric acid, comprising the steps of:
   (a) adding ethylenediamine tetraacetate into the wet process ammonium dihydrogen phosphate aqueous solution, the amount of said ethylenediamine tetraacetate added being within a range of from 0.1 to 1 wt. percent relative to crystals of ammonium dihydrogen phosphate;
   (b) heat-treating said aqueous solution at a temperature of 70° C. or more and for a time within a range of from 10 to 60 minutes, after addition of said ethylenediamine tetraacetate; and
   (c) crystallizing ammonium dihydrogen phosphate out of said aqueous solution after said heat-treating.

2. A process as claimed in claim 1, including removing impurities contained in the ammonium dihydrogen phosphate aqueous solution to purify it, before carrying out step (a).

3. A process as claimed in claim 2, wherein the step of removing impurities includes treating the ammonium dihydrogen phosphate aqueous solution with active carbon to remove organic compounds contained in the aqueous solution.

* * * * *